March 6, 1928.
L. W. PECK
1,661,498
DISPENSING DEVICE
Filed Feb. 16, 1922
2 Sheets-Sheet 2
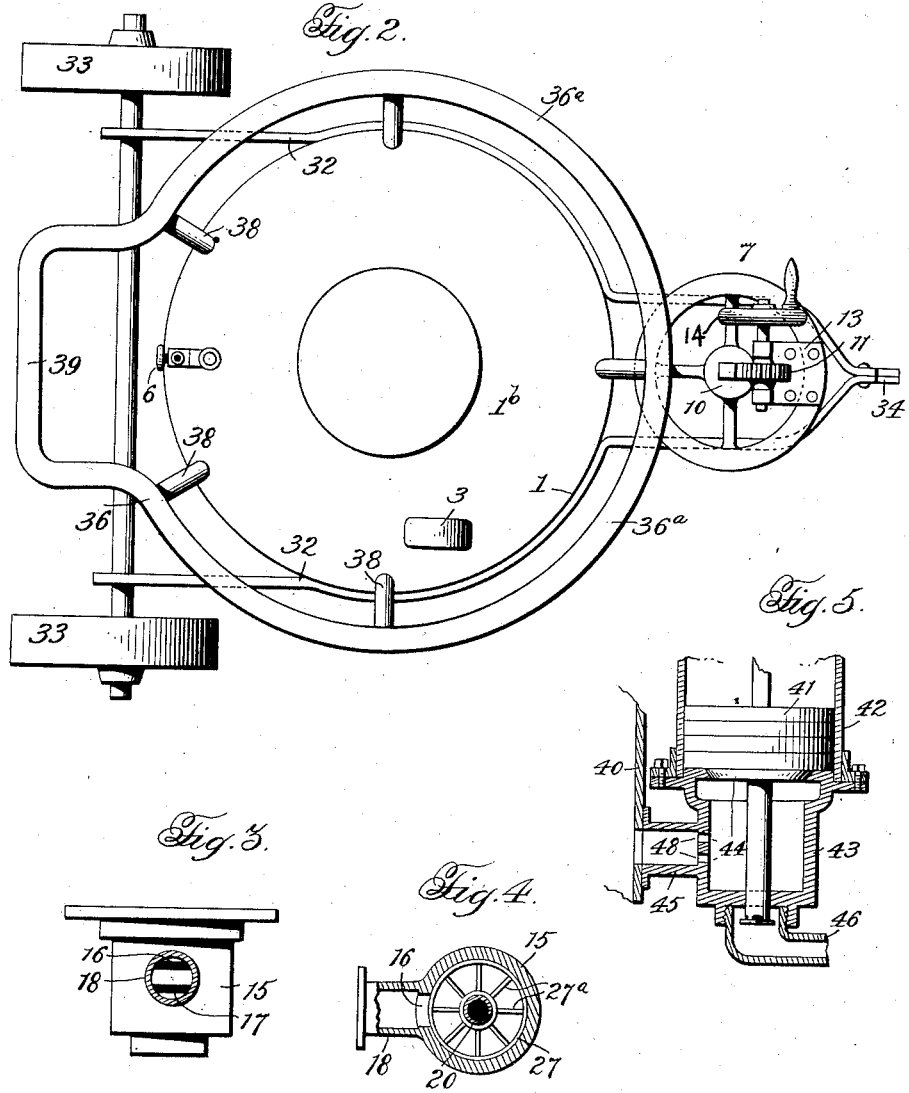

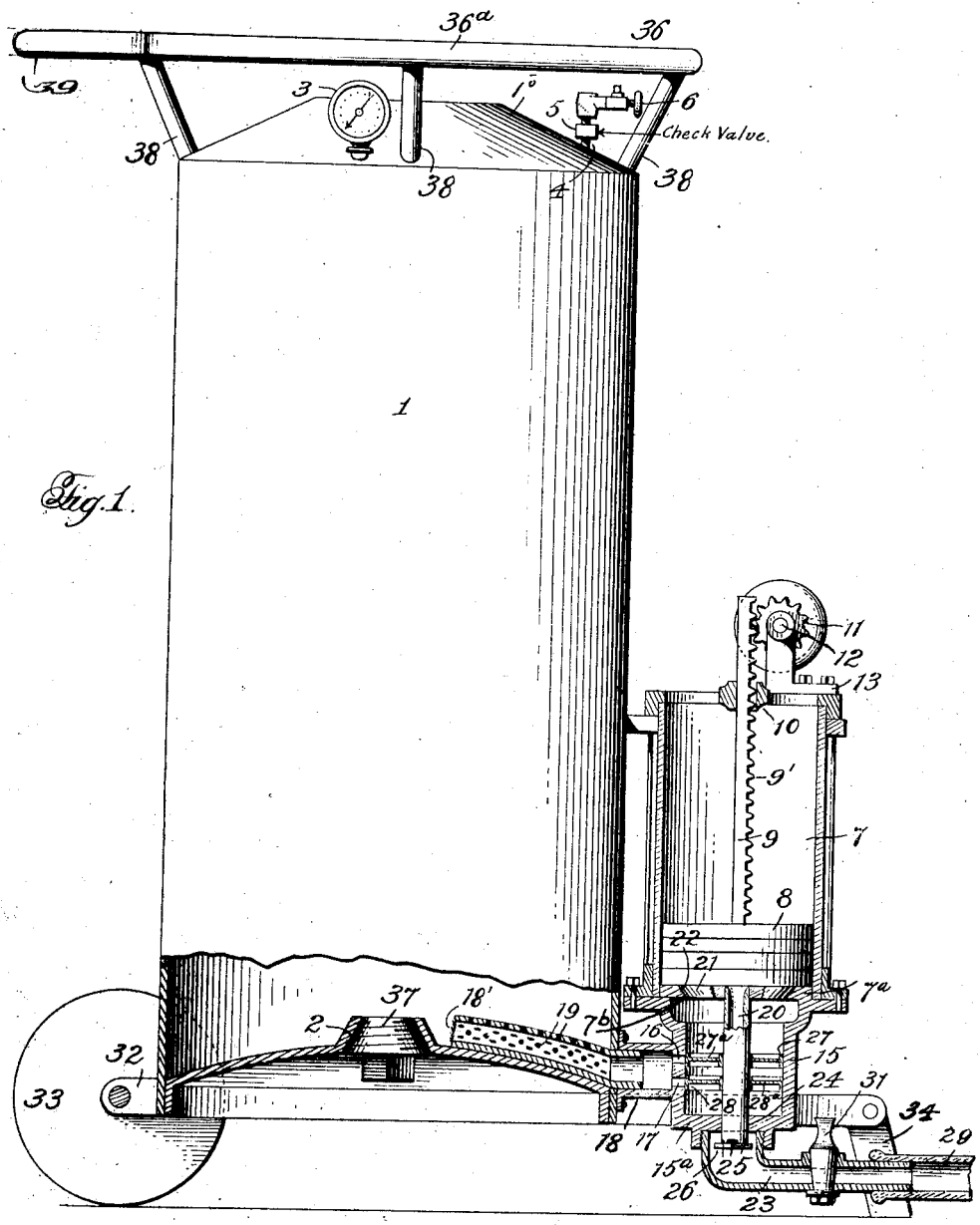

Patented Mar. 6, 1928.

1,661,498

UNITED STATES PATENT OFFICE.

LAWRENCE W. PECK, OF CHICAGO, ILLINOIS.

DISPENSING DEVICE.

Application filed February 16, 1922. Serial No. 536,998.

This invention relates to an improved dispensing apparatus susceptible of general use for delivering liquids of all kinds, for instance, oils, gasoline, kerosene, in measured quantities, and especially adapted for supplying lubricant in measured qantities to transmission and differential gear casings of motor vehicles.

In apparatus of the character referred to, it is practically impossible to determine beforehand when all of the lubricant has been fed from the storage tank, and when compressed air is employed, unless some provision is made for closing the connection between the storage tank and the measuring device during the feeding of the lubricant therefrom, the operation of the apparatus, when in an empty or nearly empty condition, will result in the blowing of grease from the transmission and differential, which is very objectionable.

The object of the present invention is to provide an improved device of this nature, to provide improved valve mechanism whereby the operation of the apparatus is more easily controlled, and whereby communication between the storage tank and measuring device during the discharge of the grease from the measuring device is automatically cut off, all danger of the objectionable blowing of grease from the automobile parts, if the apparatus should be operated when empty, being entirely avoided.

A further object of the invention is to provide an improved handle and support for the storage tank whereby the apparatus can be more advantageously handled and filled.

The invention, with other objects and advantages thereof, and the particular construction, combinations and arrangements of parts comprising the same, will be understood from the hereinafter contained detailed description, when considered in connection with the accompanying drawings, forming part hereof, and illustrating embodiments of the invention.

In the drawings:

Figure 1 is a part side elevation and vertical section of an apparatus constructed in accordance with the present invention.

Fig. 2 is a top plan view.

Figs. 3 and 4 are detail views of the valve mechanism, and

Fig. 5 is a vertical section of a slightly modified construction.

The invention comprehends a storage tank, a measuring device comprising a cylinder and piston, manually controlled operating means for the piston, a connection between the storage tank and the measuring device, a discharge pipe connected with the measuring cylinder, and valve mechanism controlled by the operation of the piston of the measuring device for alternately establishing and cutting off communication between the cylinder of the measuring device, and the storage tank and the discharge pipe.

While in the drawings, certain specific embodiments of the invention are illustrated, by way of example, it will of course be understood that minor changes and variations in the particular constructions shown, and the embodiment of the invention in other forms, as will appeal to those skilled in the are and falling within the scope of the appended claims, may be practiced without departing from the spirit of the invention.

Referring to a detail description of the particular construction illustrated in Figures 1 to 4 inclusive of the drawings, 1 designates the storage tank or reservoir for the lubricant provided with a filling opening 2, a pressure gage 3, and an inlet pipe 4 adapted to be connected to any suitable source of compressed air supply (not shown) and having associated therewith a check valve 5 and a hand valve 6 of any suitable construction.

The measuring device, which in this instance is shown supported on the tank at the lower part thereof comprises a cylinder 7 and piston 8. Any suitable means may be employed for operating the piston 8. In the drawings, the piston 8 is shown provided with a piston rod 9 slidably engaging a bearing 10 on the upper end of the cylinder 7 and having a rack 9' at its upper portion with which meshes a pinion 11 fixed on a shaft 12 suitably journaled in a bracket 13 extending from the upper end of the cylinder 7, and 14 is a hand wheel for rotating the shaft.

Adjoining the lower end of the cylinder 7 is a valve chamber or casing 15, the lower end 7ª of the cylinder having an opening 7ᵇ providing a passage from the chamber into the measuring cylinder. At one side the valve casing is provided with a pair of ports 16—17 arranged one above the other, and leading to said ports 16—17, from the storage tank 1 is a pipe 18, said pipe being shown extending into the storage tank along the bottom wall and near the central portion thereof and being open at its inner end and having openings 19 in its side wall, as shown. 18' is a screen over the inner end of the pipe. Arranged to reciprocate within the casing 15, and the lower part of the measuring cylinder 7 is a valve device comprising a stem part 20 having at its upper end a valve member in the form of a plate 21 adapted to co-operate with a seat 22 on the bottom 7ª of the cylinder 7 to close the opening 7ᵇ between the cylinder and valve chamber. The valve plate 21 has a central opening and the stem 20 is tubular to provide a passage from the upper side of said valve plate through the stem to a discharge pipe 23 connected with the bottom wall 15ª of the valve casing, the lower end portion of the tubular valve stem 20 extending through and slidably engaging the wall of an opening 24 in the bottom wall 15ª. The stem 20 is closed at its bottom, and a slight distance thereabove has a plurality of ports 25, the arrangement being such that when the valve device is in its lowermost position, as illustrated in Figure 1 of the drawings, the passage between the valve chamber and the measuring cylinder is closed, and the passage through the valve stem 20 to the discharge pipe is open while when the valve is lifted, the valve plate 21 will be moved from its seat 22, and the ports 25 in the lower portion of the stem will be closed by the wall of the opening 24. 26 designates an annular flange on the bottom of the stem 21 adapted to cooperate with the bottom wall 15ª of the valve casing to limit the upward movement of the valve device. On the valve stem, intermediate the ends thereof are two valve members 27—28 adapted to control the ports 16—17, said members 27—28 being shown as of ring formation secured to the stem 20 by arms 27ª—28ª, and slidably engaging the inner wall of the valve casing. 29 designates a flexible hose leading from the discharge pipe 23, provided at its outer end with any suitable form of nozzle and hand operated controlling valve (not shown). As illustrated in Figure 1 of the drawings, a hand operated controlling valve 31 may, if desired, also be associated directly with the discharge pipe 23.

In the operation of the apparatus, the storage tank or container having been filled with grease and supplied with the desired air pressure, and with the parts in the position illustrated in Figure 1 of the drawings, the hand wheel is turned to raise the piston 8. As the piston is lifted, the valve device will be immediately raised by the suction at the upper side of the valve plate 21, the ports 25 will be closed, the opening 7ᵇ to the measuring cylinder and also the ports 16—17 will be uncovered, and grease will be forced by the air pressure from the storage tank 1, through the ports 16—17, and opening 7ᵇ into the measuring cylinder until the piston reaches the upper limit of its movement, engaging the upper end wall of the cylinder, and the measuring cylinder has been filled. Upon the beginning of the discharge stroke of the piston, the valve device will be moved downwardly by the pressure on the upper side of the valve plate 21, said valve plate engaging its seat 22, the ports 16—17 being immediately closed, and the ports 25 in the lower portion of the valve stem 20 uncovered, communication being now established between the measuring cylinder and the discharge pipe. While the apparatus may be operated at any suitable pressure, the invention contemplates the use of a tank adapted to permit of operating at one hundred pounds pressure. The measuring cylinder, in the present instance, is shown of a size to contain one pound of grease, and, as will be understood, the capacity of the measuring cylinder being known, the amount of grease delivered may be readily determined by the number of times it is filled and discharged.

At one end the tank is provided with a wheel support. This may take any suitable form, the construction illustrated comprising a frame 32 suitably secured to the end of the tank, said frame having a pair of castor wheels 33 at one end and a supporting foot 34 at its other end, the tank being adapted to be supported in an upright position as illustrated in Figure 1, and to be tilted back upon and moved on the castor wheels. At its opposite end the storage tank 1 is provided with a combined handle and supporting base 36, the tank being adapted to be inverted and set up in an upright position upon the base 36 when the same is to be refilled with grease, in accordance with the present invention, the filling opening 2 of the storage tank being located in the bottom wall 1ª of the tank, said filling opening being closed by a removable tapered screw plug 37. The combined handle and supporting base 36 comprises a ring-like part 36ª of a diameter greater than the exterior diameter of the tank and spaced above the dome-shaped end 1ᵇ thereof, said ring-like part being connected to the tank by a plurality of longitudinally and laterally extending posts or rods 38. The ring like part is provided with a straight section 39 adapted to serve as a rest in supporting the tank in horizontal position, the tank being adapted to be tilted back on the castor wheels and said straight section engaged with the ground.

It will be noted that by the special valve mechanism hereinbefore described, an extremely simple control for the apparatus is provided, said valve mechanism acting automatically and the control of the same effected by the operation of the piston, communication between the storage tank and measuring cylinder being automatically cut off during the discharge of grease from the measuring cylinder, and all danger of objectionable blowing of the grease from the gear case or other part to be supplied, should an attempt be made to operate the apparatus when empty or nearly empty, being entirely avoided.

In Figure 5 of the drawings is illustrated a slightly modified construction particularly adapted for the smaller types of dispensers. In this view 40 designates the storage tank, 41, 42, the piston and cylinder of the measuring device. 43, 44, the valve chamber and valve device, 45 the connection between the storage tank and valve chamber, and 46 the discharge pipe. The construction here shown is the same as that illustrated in Figures 1 to 4 except that the valve device 45 is not provided with means to control the ports 48, in this modified form of apparatus the piston with the manually operable means being relied upon to fill and discharge the measuring device without the use of air pressure.

What I claim is:

1. In a grease dispensing device, the combination of a storage tank, means for supplying air under pressure to the tank, a measuring device comprising a cylinder and piston, a connection between the storage tank and cylinder, a discharge pipe connected with the cylinder, manually controlled operating means for the piston, and valve means controlled by the operation of the piston for alternately opening and closing the connections between the cylinder, and storage tank and discharge pipe, said valve means acting to maintain the connection between the storage tank and cylinder closed when the connection between the cylinder and discharge pipe is open.

2. In a dispensing device of the class described, the combination of a storage tank, a measuring device comprising a cylinder and piston, manually controlled operating means for the piston, a connection between the storage tank and cylinder, a discharge pipe connected with the cylinder, and a single reciprocating valve device controlled by the difference in pressure due to the operation of the piston for alternately opening and closing the connections between the cylinder, and the storage tank and the discharge pipe.

3. In a dispensing device of the class described, the combination of a storage tank, a measuring device comprising a cylinder and piston, manually controlled operating means for the piston, a chamber at one end of the cylinder, a passage between the cylinder and said chamber, a passage between the storage tank and chamber, a discharge pipe, and a reciprocating valve device controlled by the operation of the piston to alternately establish and cut off communication between the cylinder, and the storage tank and discharge pipe, said valve device comprising a tubular stem part forming a passage between the cylinder and the discharge pipe, a valve plate on the stem part at one end thereof to close the passage from the chamber to the cylinder, and a valve member on the stem part at the other end thereof to control the passage from the cylinder through said stem part to the discharge pipe.

4. In a dispensing device of the class described, the combination of a storage tank, means for supplying air under pressure to the tank, a measuring device comprising a cylinder and piston, manually controlled operating means for the piston, a chamber at one end of the cylinder, a passage between the cylinder and chamber, a passage between the storage tank and chamber, a discharge pipe, and a reciprocating valve device comprising a tubular stem part forming a passage between the cylinder and discharge pipe, a part on the stem part at one end portion thereof to close the passage between the cylinder and chamber, and means on the stem part for alternately opening and closing the passage between the storage tank and chamber.

5. In a dispensing device of the class described, the combination of a storage tank, a measuring device comprising a cylinder and piston, manually controlled operating means for the piston, a chamber at one end of the cylinder, a passage between the cylinder and chamber, a passage leading from the storage tank to the chamber, a discharge pipe, and a reciprocating valve device comprising a tubular stem part forming a passage between the cylinder and discharge pipe, a valve plate on the stem part at one end thereof to close the passage from the chamber to the cylinder, a valve member on the stem part at its other end portion to control the passage from the cylinder to the discharge pipe, and a member on said stem part intermediate the ends thereof and movable therewith for controlling the passage between the storage tank and chamber.

6. In a dispensing device of the class described, the combination of a storage tank, a measuring device comprising a cylinder and piston, manually controlled operating means for the piston, a chamber at one end of the cylinder, a passage between the chamber and cylinder, a plurality of ports arranged one above another leading from the storage tank to the chamber, a discharge pipe, and a reciprocating valve device comprising a tubular stem part forming a passage between the cylinder and discharge pipe, a plate on the stem part to close the passage from the chamber to the cylinder, a valve member on the stem part to control the passage from the cylinder to the discharge pipe, and a plurality of valve members on the stem part controlling said ports.

7. In a dispensing device of the class described, the combination of a cylindrical storage tank having a filling opening and a wheel support at one end thereof, and a combined handle and supporting base at the opposite end of the tank, comprising a ring like part spaced from the end of the tank and rods extending from the end of the tank and connecting the ring like part thereto.

8. In a dispensing device of the class described, the combination of a cylindrical storage tank having a filling opening and a wheel support at one end thereof, and a combined handle and supporting base at the opposite end of the tank, comprising a ring like part spaced from the end of the tank and rods extending from the end of the tank and connecting the ring like part thereto, said ring like part having a straight section adapted to serve as a rest for supporting the tank in horizontal position.

9. In a dispensing device of the class described, the combination of a cylinudrical storage tank having a dome shaped upper end, and a filling opening at its opposite end, a wheel support on the last mentioned end of the tank, and a combined handle and supporting base at the other end of the tank comprising a ring like part spaced above the dome shaped end of the tank, and rods extending longitudinally of the tank beyond the sides thereof and connecting the ring like part thereto.

10. In a dispensing device of the class described, the combination of a storage tank, means for supplying air under pressure to the tank, a measuring device comprising a cylinder and piston, manually controlled operating means for the piston, a chamber at one end of the cylinder, a passage between the cylinder and chamber, a passage leading from the storage tank to the chamber, a discharge pipe associated with the cylinder, and a reciprocating valve device comprising a stem part, a plate on the stem part to close the passage between the chamber and cylinder, means on the stem part for controlling the passage between the storage tank and chamber, and a valve part on the stem part to control the passage of material from the cylinder to the discharge pipe.

11. In a dispensing device of the class described, the combination of a storage tank, a measuring device comprising a cylinder and piston, manually controlled operating means for the piston, a chamber at one end of the cylinder, a passage between the cylinder and chamber, a passage from the storage tank to the chamber, a discharge pipe, and a reciprocating valve device comprising a tubular stem part forming a passage between the cylinder and discharge pipe, a plate on the stem part to close the passage from the chamber to the cylinder, a valve member on the stem part to control the passage from the cylinder through the tubular stem part to the discharge pipe, and a tubular valve member on the stem part for controlling the passage between the storage tank and chamber.

12. In a dispensing device of the class described, the combination of a cylindrical storage tank having a filling opening and a wheeled support at one end thereof, and a combined handle and supporting base at the opposite end of the tank.

13. In a grease dispensing device, the combination with a storage tank, means for supplying air under pressure to the tank, a measuring device comprising a cylinder and piston, a passage from the storage tank to the cylinder, a discharge pipe, a passage from the cylinder to the discharge pipe, manually controlled operating means for said piston, and valve means controlled by the difference in pressures due to the operation of the piston for alternately opening and closing the passage from the storage tank to the cylinder and the passage from the cylinder to the discharge pipe, said valve means acting to maintain the connection between the storage tank and cylinder closed when the connection between the cylinder and discharge pipe is open.

In testimony whereof I hereunto affix my signature.

LAWRENCE W. PECK.